US007824264B2

(12) United States Patent
Bartholomew et al.

(10) Patent No.: US 7,824,264 B2
(45) Date of Patent: Nov. 2, 2010

(54) RANDOM BONUS PRIZE SHOWN ON THE SYSTEM DISPLAY

(75) Inventors: Robert P. Bartholomew, Las Vegas, NV (US); Erik B. Petersen, Las Vegas, NV (US); Lawrence R. Pitman, Las Vegas, NV (US); Michael B. Shelby, Las Vegas, NV (US)

(73) Assignee: IGT, Reno, NV (US)

( * ) Notice: Subject to any disclaimer, the term of this patent is extended or adjusted under 35 U.S.C. 154(b) by 1331 days.

(21) Appl. No.: 10/668,560

(22) Filed: Sep. 22, 2003

(65) Prior Publication Data

US 2004/0072618 A1 Apr. 15, 2004

Related U.S. Application Data

(60) Provisional application No. 60/415,207, filed on Sep. 30, 2002.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/26; 463/16; 463/25; 463/27; 463/42; 273/138 A; 273/434; 273/439; 273/460

(58) Field of Classification Search ............. 463/25–28, 463/16, 20, 22
See application file for complete search history.

(56) References Cited

U.S. PATENT DOCUMENTS

| | | | | |
|---|---|---|---|---|
| 5,655,961 | A * | 8/1997 | Acres et al. | 463/27 |
| 5,885,158 | A * | 3/1999 | Torango et al. | 463/27 |
| 6,012,039 | A | 1/2000 | Hoffman et al. | 705/14 |
| 6,146,273 | A * | 11/2000 | Olsen | 463/27 |
| 6,192,142 | B1 | 2/2001 | Pare, Jr. et al. | 382/114 |
| 6,210,275 | B1 * | 4/2001 | Olsen | 463/16 |
| 6,264,557 | B1 | 7/2001 | Schneier et al. | 463/29 |
| 6,293,866 | B1 | 9/2001 | Walker et al. | 463/20 |
| 6,620,046 | B2 | 9/2003 | Rowe | 463/25 |
| 6,773,345 | B2 * | 8/2004 | Walker et al. | 463/17 |
| 6,796,899 | B2 * | 9/2004 | Baerlocher | 463/16 |
| 2002/0042294 | A1 * | 4/2002 | Pau et al. | 463/16 |
| 2002/0116615 | A1 | 8/2002 | Nguyen et al. | 713/168 |
| 2002/0151359 | A1 | 10/2002 | Rowe | 463/29 |
| 2002/0160834 | A1 | 10/2002 | Urie et al. | |
| 2002/0187834 | A1 * | 12/2002 | Rowe et al. | 463/42 |
| 2002/0187836 | A1 * | 12/2002 | Meyer | 463/42 |
| 2003/0017871 | A1 | 1/2003 | Urie et al. | |

(Continued)

FOREIGN PATENT DOCUMENTS

| | | |
|---|---|---|
| EP | 1365365 | 11/2003 |

(Continued)

*Primary Examiner*—John M. Hotaling, II
*Assistant Examiner*—Paul A. D'Agostino
(74) *Attorney, Agent, or Firm*—Armstrong Teasdale LLP

(57) ABSTRACT

A default bonus award and a set of non-default bonus awards are determined for a type of gaming machine. A criterion for qualifying for a bonus award is also determined. Then, if a bonus session is active and a player meets the criterion, a bonus award is randomly selected for the player. In one embodiment, the random bonus award is selected immediately after the player is identified at the gaming machine, before he has begun play.

82 Claims, 12 Drawing Sheets

U.S. PATENT DOCUMENTS

| | | | | |
|---|---|---|---|---|
| 2003/0036418 | A1* | 2/2003 | Seelig et al. | 463/16 |
| 2003/0162591 | A1 | 8/2003 | Nguyen et al. | 463/29 |
| 2003/0228898 | A1 | 12/2003 | Rowe | |
| 2004/0018867 | A1* | 1/2004 | Manz | 463/20 |
| 2005/0079911 | A1* | 4/2005 | Nakatsu | 463/26 |

FOREIGN PATENT DOCUMENTS

| | | |
|---|---|---|
| GB | 2382448 | 5/2003 |
| WO | WO00/16864 | 3/2000 |
| WO | WO00/17830 | 3/2000 |
| WO | WO02/32524 | 4/2002 |
| WO | WO03/003319 | 1/2003 |
| WO | WO03/014870 | 2/2003 |

* cited by examiner

RANDOM BONUS PRIZE SHOWN ON THE SYSTEM DISPLAY

RELATED APPLICATION DATA

This application claims priority from U.S. Provisional Patent Application Ser. No. 60/415,207, filed Sep. 30, 2002, which is hereby incorporated by reference.

FIELD OF THE INVENTION

This invention pertains to bonus prizes, and more particularly to bonus prizes awarded randomly during a bonus session.

BACKGROUND OF THE INVENTION

When gambling as an industry was in its infancy, the lure of the possibility of winning big money was enough to attract players. Casinos as envisioned today were a concept yet to be considered, gaming machines were relatively sparse, and the expense of travel (both financially and temporally) limited players' options.

The growth shown by Las Vegas, Nev., Atlantic City, N.J., and other gambling hot spots, the variety of different gaming devices, and the ability to travel long distances quickly and cheaply have conspired to change the player's perception of the industry. There are near infinite variations of gaming devices, and the increasing number of casinos provides players with many choices as to where to spend their time (and money).

In an effort to distinguish themselves from each other, casinos have started to offer players advantages for being loyal. Player tracking databases, which store information about players and track their activity levels over time, can be used to reward loyal patrons. After a player has played enough (measured either in time or money), the casino can reward the player for his loyalty: for example, a complimentary meal, show, or room. In return, the casino has a player that is more likely to play the casino's machines than elsewhere.

Other ways to encourage customer loyalty lie in giving players bonuses. For example, if a player hits a particular combination of symbols at a particular time, the player can receive a bonus on top of the ordinary jackpot associated with the symbol combination. The chance to win even more than the typical jackpot can attract players to a casino.

A problem is that they often provide only a short-term increase, which can even be temporary. Other casinos follow suit with promotions of their own, again leveling the playing field and giving each casino little to distinguish themselves. Therefore, casinos are always looking for new ways to attract patrons.

SUMMARY OF THE INVENTION

The invention is an apparatus, system, and method for giving players a bonus award. A set of bonus awards includes at least two awards. A criterion defines the condition(s) under which a player can receive a bonus award. If a player meets the criterion, then a selector selects one of the bonus awards, and an awarder delivers the selected bonus award to the player.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
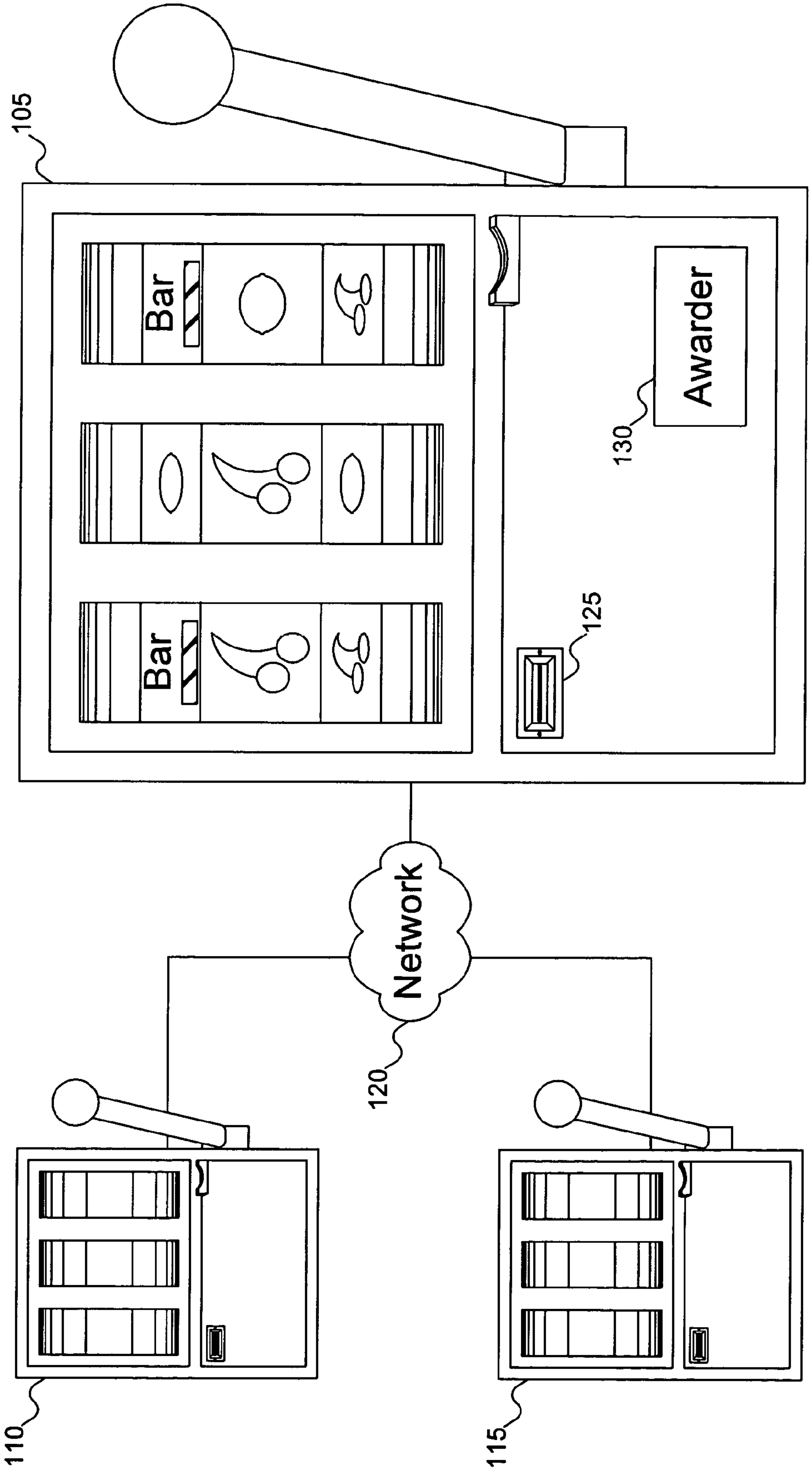
FIG. 1 shows several gaming machines connected by a network, according to an embodiment of the invention.

FIG. 1 shows several gaming machines connected by a network, according to an embodiment of the invention. In FIG. 1, three gaming machines, 105, 110, and 115, are shown. Although gaming machines 105, 110, and 115 are shown as slot machines, a person skilled in the art will recognize that gaming machines 105, 110, and 115 can be any variety of gaming machines: for example, video poker or video blackjack. In addition, embodiments of the invention are not limited to gaming machines where the user plays independently, but are capable of being applied to other games. For example, embodiments of the invention are applicable to table games, such as poker, blackjack, and roulette, and other games, such as bingo or keno. In the remainder of this document, "gaming machine" is intended to refer to any game, be it electronic or mechanical, table, paper, or other form, to which an embodiment of the invention can be adapted.

Gaming machines 105, 110, and 115 are connected to network 120. Network 120 acts to allow the gaming machines to communicate, typically with servers that monitor the operations of the gaming machines.

Gaming machine 105 is also capable of identifying a player (although typically gaming machine is only involved in the process and does not completely identify the player by itself). In FIG. 1, gaming machine 105 performs this identification process using card reader 125. Card reader 125 receives the player's card, which includes information that identifies the player to the gaming machine (and through the gaming machine to the system, as described further below with reference to FIG. 2).

Although FIG. 1 shows gaming machine 105 identifying the player using card reader 125, there are other ways for gaming machine 105 to identify the player. For example, the player can enter a unique identification number using a keypad. Or, gaming machine 105 can determine a biometric of the player (such as the player's fingerprint, voiceprint, iris scan, heat signature, or other biometric), which can be used to identify the player. A person skilled in the art will recognize other ways that can be used to identify the player.

Although FIG. 1 shows card reader 125 as being installed in gaming machine 105, a person skilled in the art will recognize that the mechanism by which the player is identified can be remote from gaming machine 105. For example, the player can be identified at a kiosk, and indicate that he will be playing gaming machine 105. In this situation, gaming machine 105 is completely separate from the mechanism by which the player is identified. It can also occur that gaming machine 105 is partly involved in identifying the player. For example, the player can present a biometric to gaming machine 105, which is then transmitted to a server, where the player is identified from the biometric. A person skilled in the art will recognize other ways in which gaming machine 105 can be involved in or separate from the identification of the player.

Finally, gaming machine 105 includes awarder 130. Awarder 130 is responsible for awarding the player any bonuses to which the player is entitled. The operation of awarder 125 is described further below with reference to FIGS. 3-5.

Figure 2:
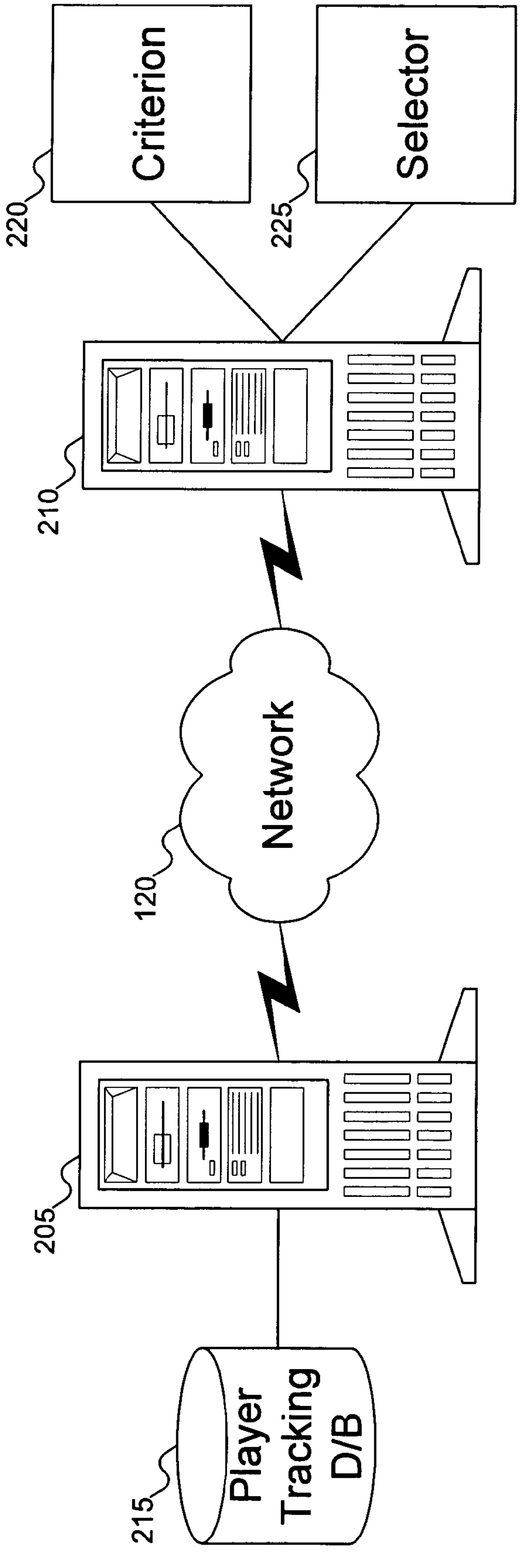
FIG. 2 shows a server and a bonus server connected to the network of FIG. 1, according to an embodiment of the invention.

FIG. 2 shows server 205 and bonus server 210 connected to network 120 of FIG. 1, according to an embodiment of the invention. Server 205 includes player tracking database 215, which stores information about the player. For example, player tracking database can include information such as the player's name and address, the total amount the player has wagered since being added to the player tracking database, the date of the player's last visit to the casino, and information about the last bonus the player received (such as an identifier for the bonus session, the size of the award, and the type of gaming machine the player was using).

In contrast, bonus server 210 is responsible for managing information about bonuses to be awarded. Bonus server 210 includes criterion 220 and selector 225. Criterion 220 adds a criterion to be used in determining whether a player is to receive a bonus award. If the player meets the criterion at the time the bonus is awarded, the player receives the bonus; otherwise, the player does not receive the award. Criterion 220 can be any of a variety of different criteria. One type of criterion that can be used is one that relates to a player's status. For example, criterion 220 can be simply that the player has an account in player tracking database 215. Or, criterion 220 can be that the player has just been identified by the gaming machine. Or, criterion 220 can be that the player has wagered at least $100 in the past three months. Or, criterion 220 can be that the player's account in player tracking database 215 indicates that the player is a VIP player. A person skilled in the art will recognize other types of criteria that relate to a player's status.

Another type of criteria that can be used is one that depends on the player's actions at the gaming machine. For example, criterion 220 can be that the player has a current coin-in of $200. Or, criterion 220 can be that the player has lost $100 in the current session. Or, criterion 220 can be that the player has just hit a particular winning combination on the gaming machine. A person skilled in the art will recognize other types of criteria that relate to a player's actions.

In addition to criteria that depend on a player's status or actions, other types of criteria can be used. An example of a criterion that is external to a player's status or actions is the player being identified by the gaming machine. For example, after the player sits down at the gaming machine, but before the player has begun to play the gaming machine, the player identifies himself to the gaming machine. As discussed above with reference to FIG. 1, the player can be identified in any number of ways. Assuming the gaming machine identifies players using a card reader, then the player's sliding his card into the gaming machine identifies the player to the gaming machine.

Other example criteria that can be used include:

- Playing a particular gaming machine (e.g., game type, game manufacturer, or game denomination)
- Being a carded player
- Being a non-carded player
- Reaching a theoretical win level/frequency
- Reaching an actual win level/frequency
- Reaching an actual loss level/frequency
- Having last played within a certain amount of time
- Having a minimum frequency of visit level
- Having a minimum play per visit level
- Having a particular demographic
- Having a particular entry in a database (e.g., a favorite color)
- Having had an account for a minimum length of time
- Achieving one or more particular gaming machine positive outcomes (e.g., hitting a particular jackpot on one or more gaming machines) or negative outcomes (e.g., not hitting a particular jackpot), perhaps consecutively and/or in combination
- Achieving a certain number of gaming machine outcomes in some number of tries
- Achieving one or more particular outcomes relative to other players
- Earning a certain number of points
- Having a minimum number of handles per trip/unit time
- Having a minimum amount of continuous play
- Being selected as the player who caused the bonus pool to reach a threshold amount
- Playing at a particular time
- Being in physical proximity to another player (e.g., a player hitting a jackpot)
- Having a minimum amount of time since last win
- Having a minimum amount of time since last bonus
- The bonus pool reaches a threshold A person skilled in the art will also recognize that criterion 220 can be a compound criteria (that is, that two or more criteria be used in some combination, conjunctively and/or disjunctively), and that the compound criteria can combine criteria relating to both a player's status and a player's actions.

Selector 225 selects a random bonus award for players. The operation of selector 225 is discussed further below with reference to FIGS. 3-4.

Although FIG. 2 shows server 205 and bonus server 210 as separate components, a person skilled in the art will recognize that the operations of bonus server 210 can be performed anywhere within the system. The use of both server 205 and bonus server 210 aids in implementation by separating different functions to different servers and helps to isolate the award system and protect against accusations of bias. In this embodiment, once the player tracking database has identified the user, the player's record is checked to see if the player has been awarded a bonus this session. If not, the bonus server is signaled to generate a bonus award. But the bonus award system can be implemented on any server, and not one dedicated to bonusing.

Figure 3:
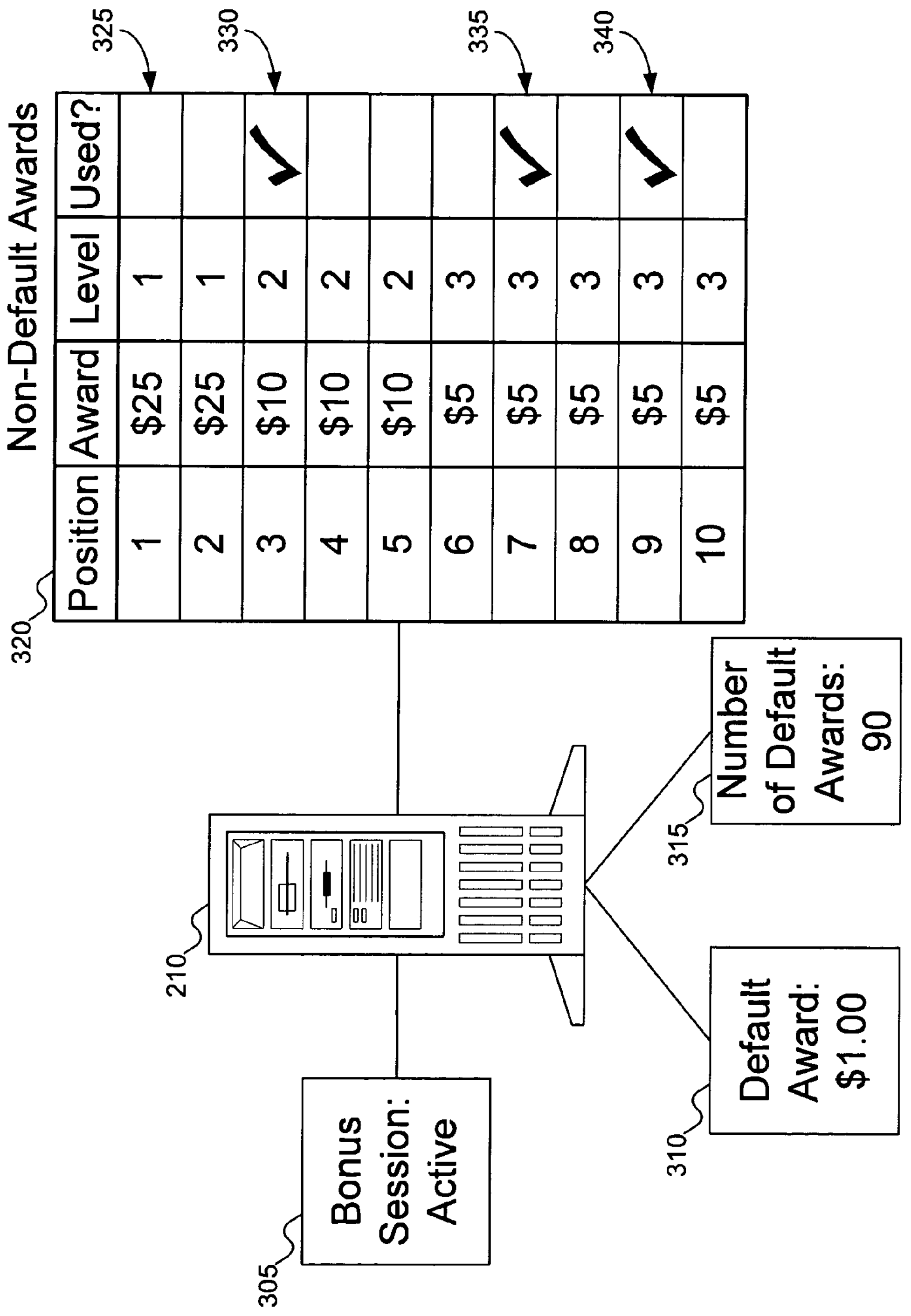
FIG. 3 shows a first embodiment for storing non-default awards in the bonus server of FIG. 2, according to an embodiment of the invention.

FIG. 3 shows a first embodiment for storing non-default awards in the bonus server of FIG. 2, according to an embodiment of the invention. In FIG. 3, bonus server 210 is shown storing information about a bonus session. According to box 305, the bonus session is currently active. If there is no bonus session currently active, then no random bonus awards are to be made. Although FIG. 3 shows information about only one bonus session, a person skilled in the art will recognize that there can be multiple bonus sessions: for example, one each for different groups of games. Thus, there can be one bonus session for video poker, another bonus session for table blackjack, and a third bonus session for keno. Or, there can be one bonus session for video games, one bonus session for table games, and one bonus session for paper games. In addition, bonus sessions can be defined in ways other than by the type of game. For example, there can be a bonus session for a group of machines located in a particular area on the casino floor, even if the area includes games of different types. A bonus session can even include multiple non-contiguous areas of the casino floor, if desired. A person skilled in the art will recognize other ways in which gaming machines can be grouped for purposes of bonus awards. These multiple bonus sessions can run independently of each other, can have different award pools and different award probabilities, can have different durations, and can have different start and end times. In this embodiment, it is useful to have the bonus award determined using a bonus server, to have a dedicated machine processing the bonuses.

Bonus server 210 also includes default awards and non-default awards. The default award, as shown by box 310, is set at $1.00. As indicated in box 315, there are 90 default awards. Although FIG. 3 shows a non-zero default award, a person skilled in the art will recognize that the default award can be zero. If the default award is zero, then if a default award is selected the system operates as if the player received no bonus award (as would happen, for example, if the player does not meet the criterion for the bonus award, or no bonus session is currently active). It is also possible that default awards can be omitted, in which case the random number generator selects an award only from the non-default awards.

Table 320 shows the non-default awards. Using entry 325 as an example, the entry is in the first position in table 320. Entry 325 stores a $25 award, which is considered a level 1 award. As there is no checkmark in the used column, this award is still available for use. In contrast, entries 330, 335, and 340 are indicated as used.

As shown, there are two $25 awards, three $10 awards, and five $5 awards, for a total of ten non-default awards. But a person skilled in the art will recognize that there can be any number of non-default awards, and each award can have any desired value.

Figure 4:
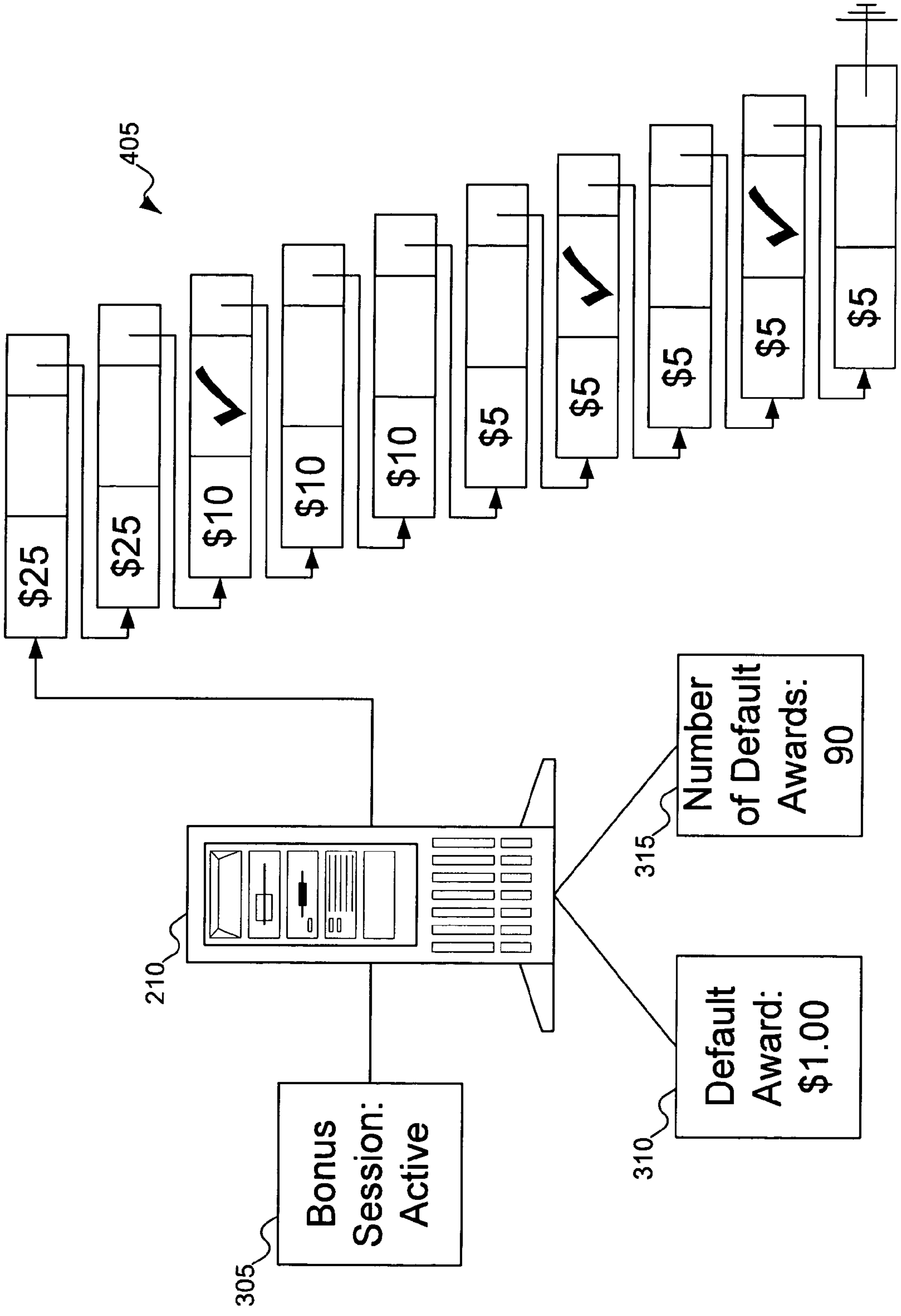
FIG. 4 shows a second embodiment for storing non-default awards in the bonus server of FIG. 2, according to an embodiment of the invention.

Although storing the non-default awards in a table is one possible representation, a person skilled in the art will recognize other ways in which the non-default awards can be stored. FIG. 4 shows a second embodiment for storing non-default awards in the bonus server of FIG. 2, according to an embodiment of the invention. In FIG. 4, the non-default awards are stored as linked list 405. The effect of linked list 405 is the same as that of non-default awards table 320 of FIG. 3, although the representation is different. Notice that the first $10 award and two of the $5 awards have been marked as used, paralleling the approach of FIG. 3. A person skilled in the art will recognize other data structures that can be used to represent the available non-default awards.

Typically, the number of default and non-default awards are determined by having the casino select the desired values for the default and non-default awards. Then, initial probabilities for the awards are determined by the casino. The appropriate number of non-default awards (at each level) necessary to establish the desired odds are defined in bonus server 210, using whatever data structure is desired. Then, the appropriate number of non-default awards are defined in box 315. For example, if the initial odds on winning one of the $25 non-default awards are to be 2%, then (given that there are a total of ten non-default awards) 90 default awards are needed. On the other hand, if the odds of winning one of the $25 non-default awards are to be 1%, then 190 default awards are needed.

The reader may have noticed that the non-default awards are managed individually, whereas the default awards managed communally. The reason for this distinction is that in one embodiment, default awards, even if selected, remain available for future use. That is, if a non-default award is selected, it is removed from the list of available awards, but if a default award is selected and awarded to a player, the number of default awards remains unchanged. This means that, using the non-default awards of FIGS. 3-4, there can be at most two people winning a $25 non-default award, but there can be hundreds of people winning default awards. As a result, the non-default awards become scarcer over time, and the default awards become increasingly likely. But a person skilled in the art will recognize that this design is not required: the default awards can be removed once they are individually used, and/or the non-default awards can remain available for future selection.

Selector 225, discussed above with reference to FIG. 2, is responsible for selecting an bonus award for the player (assuming the player otherwise qualifies for a bonus award). Selector 225 picks from the default awards and the available (that is, not yet used, assuming the non-default awards are removed from the system after use) non-default awards. Selector 225 can pick the award using a random number generator. For example, in FIGS. 3-4 there are 100 possible awards initially. Selector 225 calls upon the random number generator to pick a number between 1 and 100. Numbers 1-10 correspond to positions 1-10 of non-default award table 320 (or to the ten entries in linked list 405); the remaining 90 numbers correspond to default awards. Selector 225 traverses non-default award table 320 or linked list 405 if the number is between 1-10, and checks to see if the entry has been used. If the entry is marked as used, then selector 225 calls upon the random number generator to pick a new number between 1 and 100, until an available award is found. Otherwise, selector 225 marks the award as used (if awards are not re-used: in the embodiments illustrated in FIGS. 3-4, this applies only to non-default awards), and delivers the award to the gaming machine to be awarded to the player (using awarder 130 of FIG. 1).

A real-world analog that may be useful to consider is that of a jar filled with colored marbles representing the different award levels. When an award is to be made, a marble is pulled from the jar. If the marble color indicates a non-default award, the award is made and the marble set aside (that is, not returned to the jar). But when the marble color indicates a default award, after the award is made the marble is returned to the jar. This means that the odds of receiving one of the higher level awards decreases as time passes, since only the marbles representing the higher level awards are set aside after they are drawn from the jar.

A person skilled in the art will recognize that other methods can be implemented to eliminate "used" awards. For example, instead of marking an entry in non-default awards table 320 as used, the entry can be deleted and the random number generator set to draw from a pool size reduced by 1. Or, if linked list 405 is used instead of non-default awards table 320, when a non-default entry is selected, it can be removed from the linked list. A third possibility is to use linked list 405, but randomly populate the list with the available non-default awards. Then, when the random number generator selects a number representing a higher level award, the award at the head of the list is awarded, and that award removed from the list. Eventually the list will be empty: at that point, the random number generator is no longer needed.

As discussed above with reference to FIGS. 3-4, it is possible that the non-default awards can also be reused, as opposed to eliminated. In that variation, the probability of receiving any particular bonus does not vary over time, unless the probabilities are manually changed. Entries in the table (or other data structure) are not removed or marked as "used" after they have been awarded. In the real-world analog described above, this is equivalent to returning marbles to the jar after they are drawn, regardless of color.

Although FIGS. 3-4 show only cash awards, a person skilled in the art will recognize that this is not a limitation of embodiments of the invention. Awards can be in the form of cash, credits, or non-monetary awards, such as a car, or any combination thereof. For example, the highest level award can be a car, the next level prize a big screen television set, the third level prize $100 in cash, the fourth prize a $50 credit on the gaming machine, and so on.

If credits are awarded instead of cash or non-monetary awards, the credits are available to the player for use, but do not have to be used while playing the game in which the credits were awarded. In one embodiment, the credits do not expire: the player can use them at any time (although he cannot cash them out). In another embodiment, the credits can be made to expire. That is, at some point (for example, when the session ends), any credits awarded to the player that he has not used are lost.

Not shown in FIGS. 3-4 are consolation awards. These are awards given when the player does not even win a default award. As with all of the awards, consolation awards can be set by the casino to any value, and can be omitted if desired. Consolation awards can be made at any time desired: for example, if the player fails to receive a bonus award at all during the bonus session, the consolation award can be given at the end of the bonus session. In addition, the criterion can be applied to the consolation award, limiting its delivery to only certain players. The criterion used for consolation awards can be same as criterion 220, or it can be a different criterion.

Now that the components of embodiments of the invention have been explained, the operation of embodiments of the invention can be explained. In one embodiment, the system checks to see if a bonus session is active for the gaming machine used by the player. If no bonus session is currently active, then no award is determined according to the description contained herein.

The bonus can be awarded at varying times. In one embodiment, the bonus award is determined at the time the player is identified by the gaming machine. In another embodiment, the award is determined only after the player has played a required number of credits. In a third embodiment, the award is determined only after the player has played for a predetermined amount of time. A person skilled in the art will recognize other triggers that can be used to set off the bonus award.

In one embodiment, the player can receive only one bonus during a bonus session. This is typically accomplished by storing in the player tracking database identifiers of bonus sessions in which the player has received a bonus. In another embodiment, the player can receive multiple awards. For example, the bonus award can be given every time the player is identified during the session. (The system would also watch to make sure that the player does not take advantage by repeatedly stopping and re-starting play, to receive a new bonus.) Or, the player can receive an additional award after playing a required number of credits or for a predetermined amount of time. A person skilled in the art will recognize other variations that can be implemented.

Once an award has been selected for the player, information about the award is sent to the player's gaming machine in a message. The message can include a text field that can be displayed to the user. The message can also include the value of the award.

Figure 5:
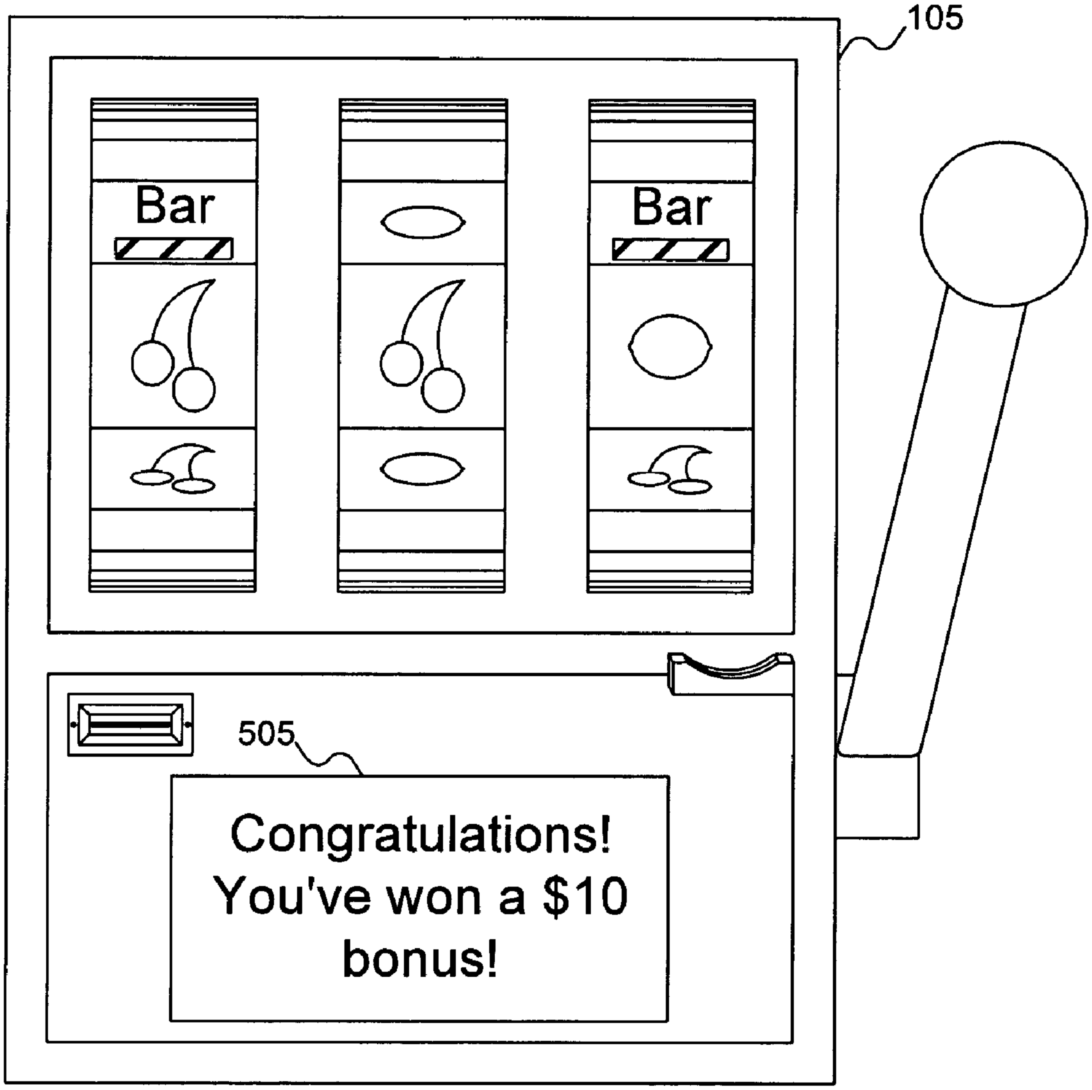
FIG. 5 shows the gaming machine of FIG. 1 notifying the user of the bonus award using a secondary display, according to an embodiment of the invention.

FIG. 5 shows the gaming machine of FIG. 1 notifying the user of the bonus award. In FIG. 5, gaming machine 105 includes display 505. Display 505 visually notifies the player of the award. The visual display can include simply a text message, as shown, or can include a more graphic display, to catch the player's attention, perhaps involving animation or video. Gaming machine 105 can also use audio information to alert the user to the bonus.

Figure 6:
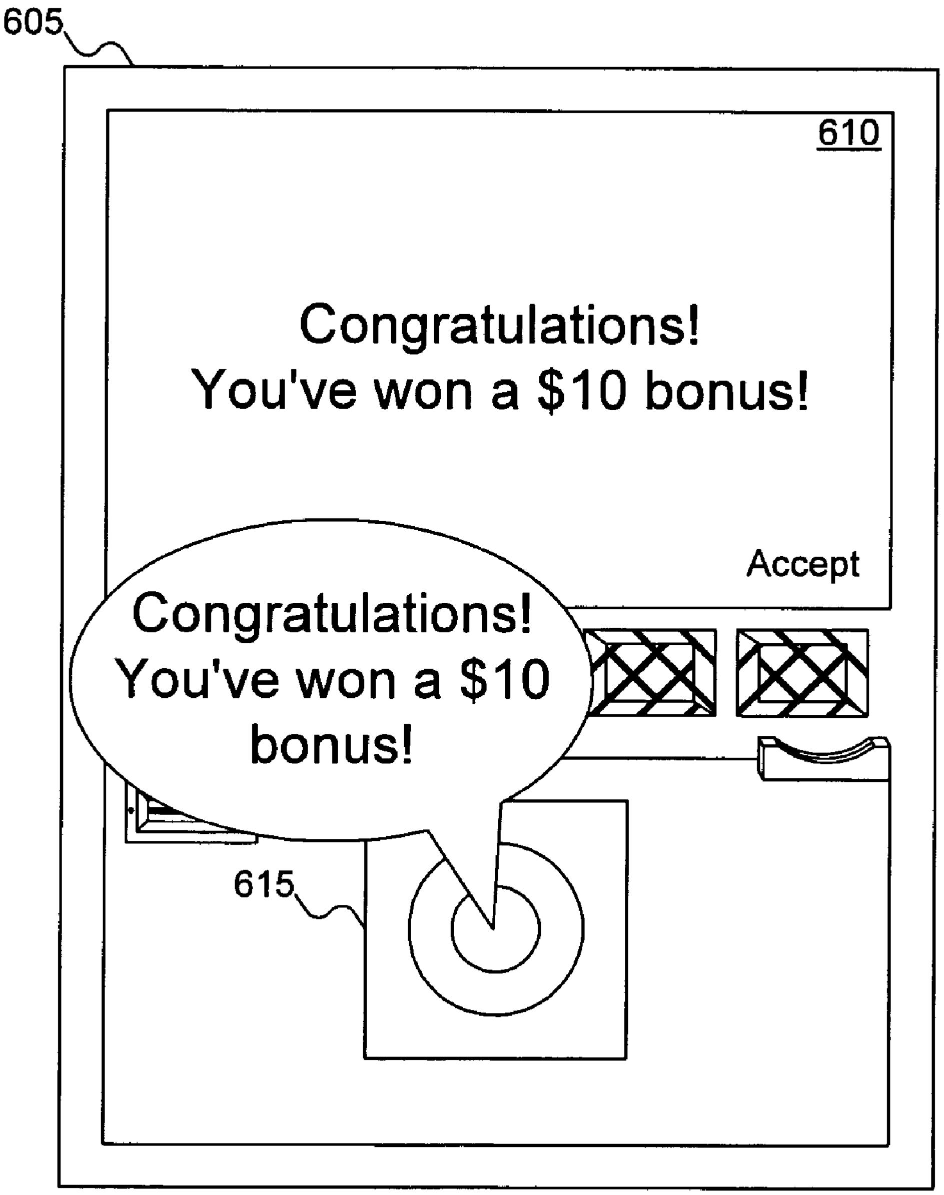
FIG. 6 shows the gaming machine of FIG. 1 notifying the user of the bonus award using a primary display and using audio, according to an embodiment of the invention.

Although FIG. 5 shows gaming machine 105 as a slot machine, a person skilled in the art will recall that gaming machine 105 can be any variety of gaming machine. If the gaming machine includes a display for purposes of playing the game, display 505 can be a secondary display to the gaming machine. But a person skilled in the art will recognize that the gaming machine can use its primary display for the notification. For example, if the gaming machine is a video poker machine, the display that typically shows the player's hand can be changed to provide the notice of the bonus award to the player, instead of using a secondary display. This situation is shown in FIG. 6, where gaming machine 605 has native display 610 used for the game (e.g., for video poker), which is also used to give the player notice of the award. Gaming machine 605 is also shown has having speaker 615, which can be a native speaker of gaming machine 605 (that is, used to provide sound effects for the game) and is used to present the player with aural notice as well (although a person skilled in the art will recognize that a separate speaker can also be used). A person skilled in the art will recognize that textual, graphical, and aural notice can all be used independently for notification purposes.

In one embodiment, the machine simply notifies to the player that he has won an award. In another embodiment, the machine presents the user with the illusion that the award is being determined at the machine (as opposed to having been determined by a random number generator at the bonus server). The machine can display a varying list of awards, for example on a spinning wheel. The machine makes the display stop on the selected award. So, if the user is awarded a default award of a $1 credit, the display stops on a symbol representing a $1 credit. This gives the player the illusion that the outcome is not determined in advance of the message announcing the award. U.S. patent application Ser. No. 09/104,145, filed Jun. 23, 1998, now U.S. Pat. No. 6,375,567, issued Apr. 23, 2002, and U.S. Provisional Patent Application Ser. No. 60/411,273, filed Sep. 16, 2002, incorporated herein by reference, describe other ways in which the award can be presented to the user.

In an ideal world, the player information can be retrieved from the player tracking database and the award determined instantaneously. The real world, however, is not so idyllic. It takes some (small) amount of time to locate the player information in the player tracking database, and it takes some (small) amount of time to determine the player's award, if he is entitled to one. It is possible that, during the time needed to identify the player from the player tracking database, determine an award, and send the results back to the machine, the player has stopped playing. In that case, the award should be discarded. Especially where it is possible that a second player can be identified before the award is made, the award generated for the first player should be dropped. In that case, the award can be returned to the pool of available bonuses. Thus, if the award is a non-default award, it can be made available to another player at a later time.

Figure 7A:
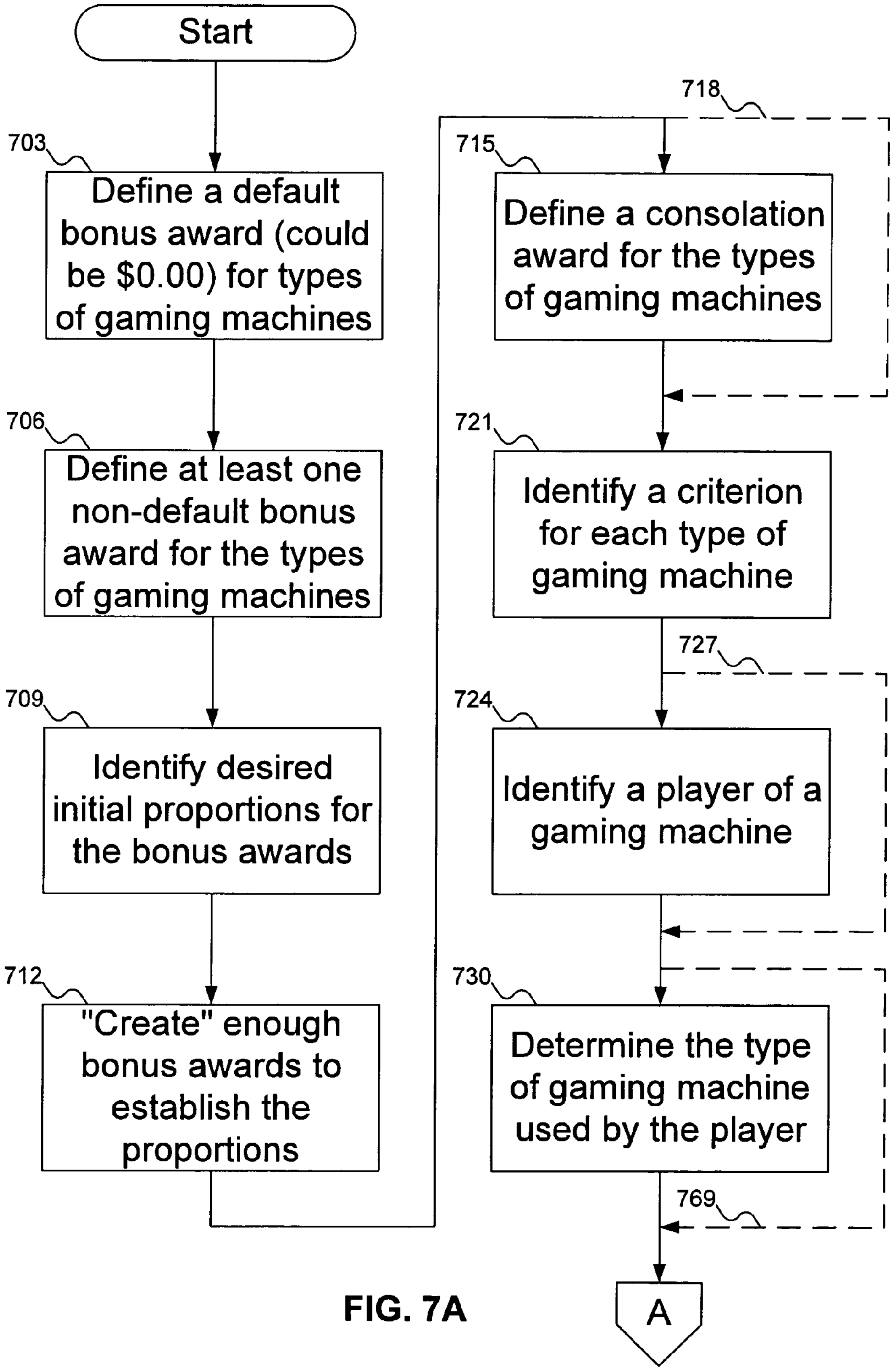
FIGS. 7A-7D show a flowchart of the procedure for awarding a random bonus award in the system of FIG. 1, according to an embodiment of the invention.
Figure 7B:
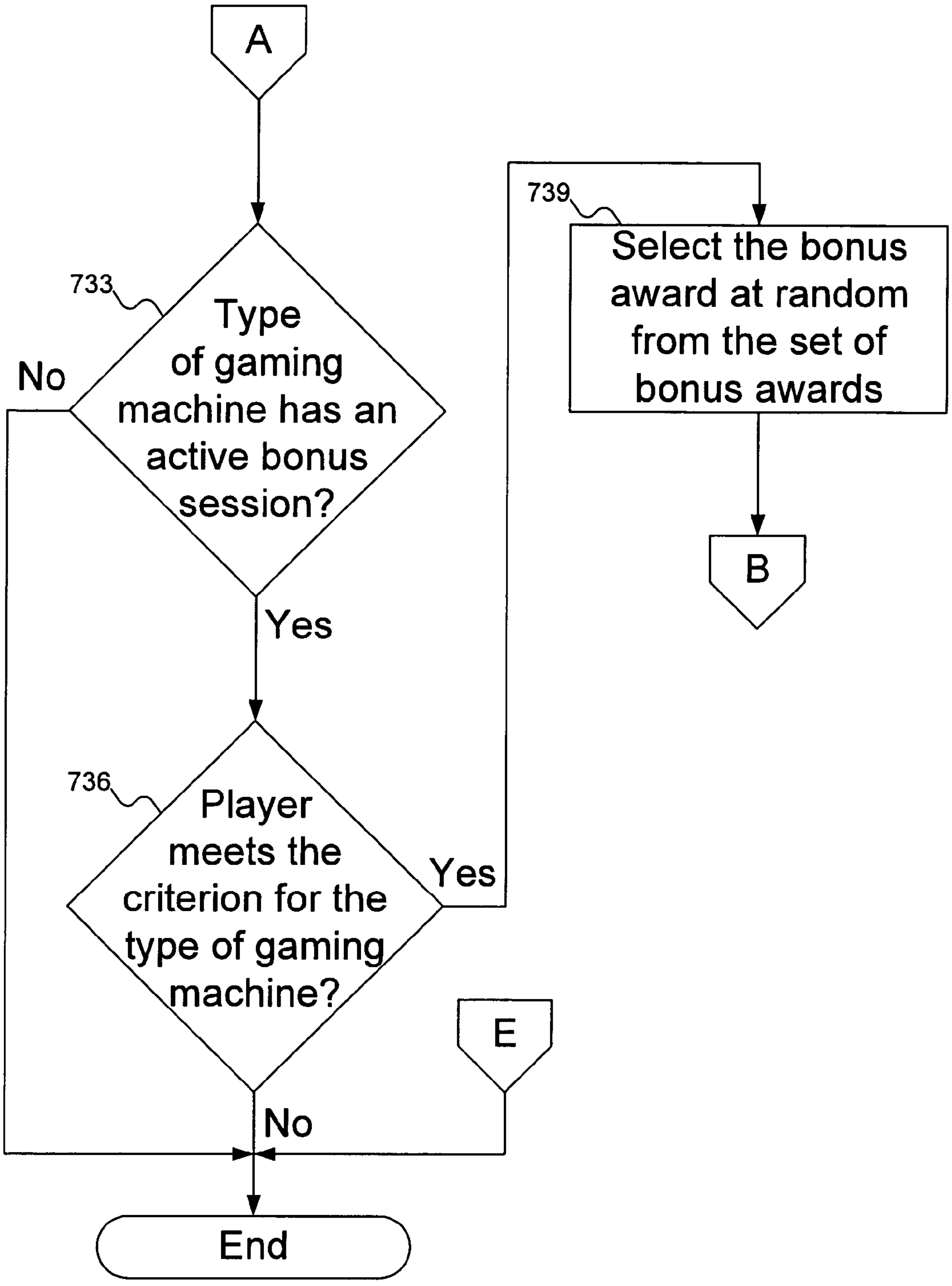
Figure 7C:
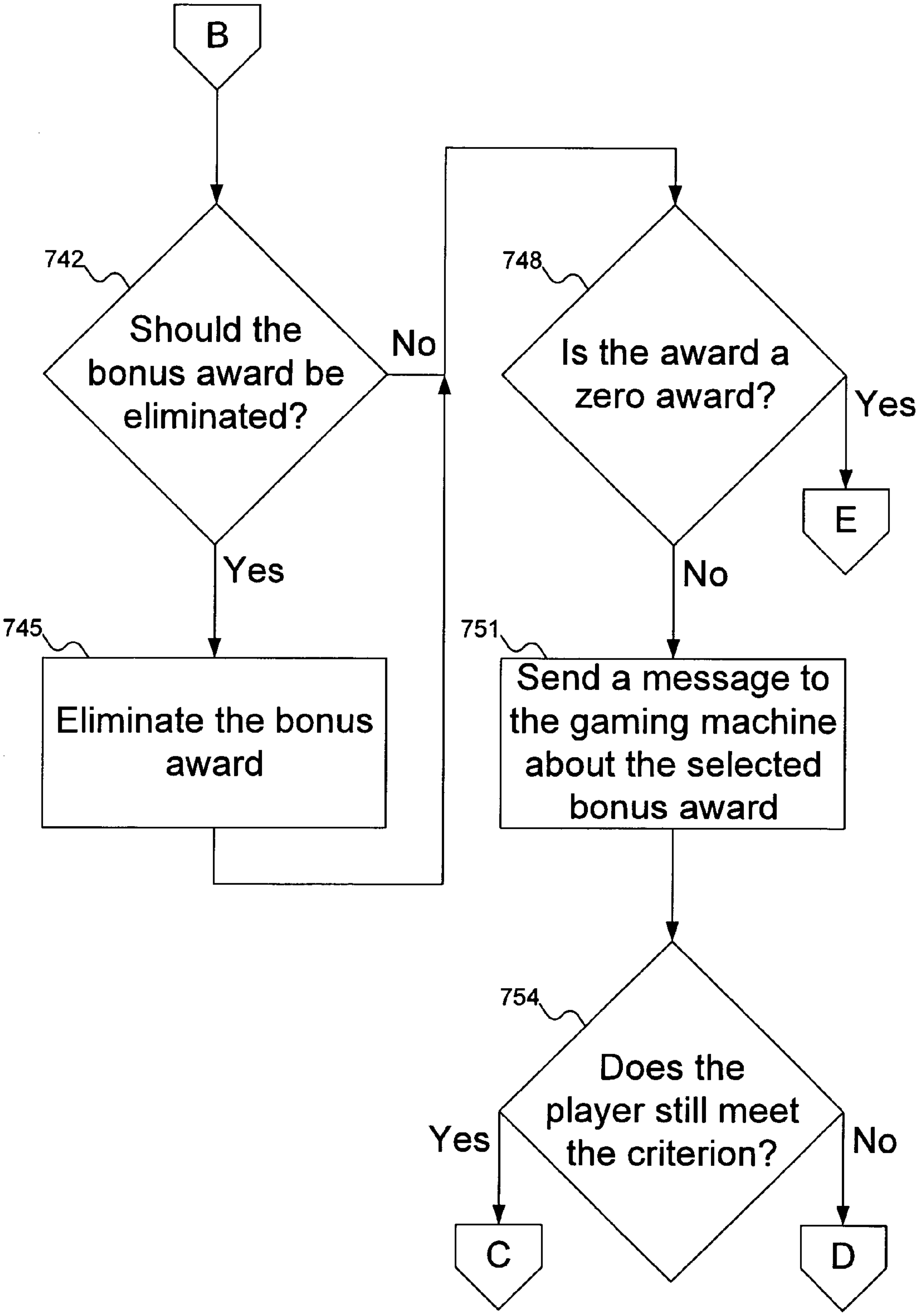
Figure 7D:
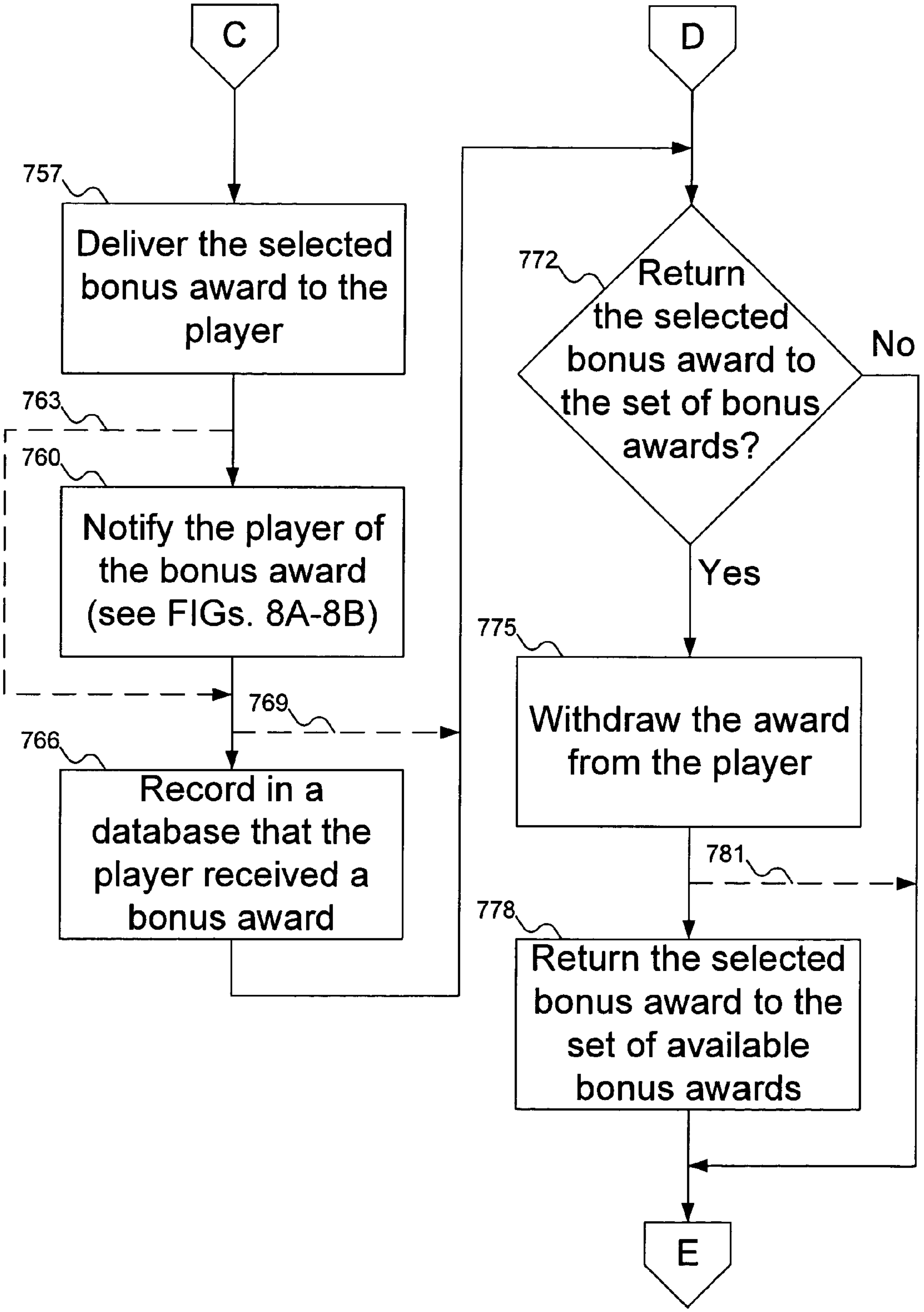

FIGS. 7A-7D show a flowchart of the procedure for awarding a random bonus award in the system of FIG. 1, according to an embodiment of the invention. In FIG. 7A, at step 703, default bonus awards are defined for types of gaming machines. A person skilled in the art will recognize that there can be different default bonus awards for different types of gaming machines, and that there can be one default bonus award for all types of gaming machines, among other possibilities. In addition, the phrase "type of gaming machine" (and its equivalents) can be interpreted to mean groups of gaming machines, regardless of "type." Throughout the remainder of this document, it is to be understood that any reference to a type of gaming machine can be interpreted as a reference to all gaming machines together, or to any desired grouping of gaming machines.

At step 706, at least one non-default bonus award is defined for the types of gaming machines. At step 709, the desired proportions (that is, initial probabilities) for the non-default bonus awards are identified, and at step 712, enough bonus awards (both default and non-default are created to establish the initial proportions. At step 715, a consolation award is defined for the types of gaming machines. As shown by arrow 718, step 715 can be omitted.

At step 721, a criterion is identified for each type of gaming machine. At step 724, a player of a gaming machine is identified. At shown by arrow 727, step 724 can be omitted. If step 724 is omitted, then the criterion identified in step 721 is based on the player's actions and not his status (since the player's status cannot be determined without identifying the player). Thus, for example, the criterion could be that the player have a total coin-in of $100, but not that the player have an account in the player tracking database. (Where the player is not identified, the criterion is usually based on a session determined by the player's actions: that is, a sequence of plays sufficiently close together to make it likely that all plays were made by the same player.) At step 730, the type of the gaming machine being used by the player is determined. As shown by arrow 727, step 730 can be omitted. For example, if the random bonus award does not depend on the type of gaming machine being used, step 730 can be omitted.

At step 733 (FIG. 7B), the system checks to see if the gaming machine type has a currently active bonus session, and at step 736, the system checks to see if the player meets the criterion. If there is no currently active bonus session for the gaming machine type, or if the player does not meet the criteria, then processing ends. Otherwise, at step 739, the system selects a bonus award at random.

At step 742 (FIG. 7C), the system checks whether the selected bonus award should be eliminated. As discussed above with reference to FIGS. 3-4, typically the non-default bonus awards are used only once, after which they are eliminated, but default bonus awards are reused, and so are not eliminated. If the selected bonus award is to be eliminated, then at step 745 the bonus award is removed from the set of bonus awards. At step 748, the system checks to see if the selected bonus award is a zero award (which can happen if the default award is zero: typically, non-default awards are not zero awards). If the selected bonus award is a zero award, then processing ends. Otherwise, at step 751 the system sends a message to the gaming machine about the selected bonus award.

At step 754, the gaming machine verifies that the player still meets the criterion. As discussed above, it can happen that between when the system selects the award for the player and when the gaming machine tries to give the player the award that the player no longer qualifies for the award. Having the gaming machine double-check the player's eligibility at step 754 protects against the problem. If the player still meets the criterion to receive the award, then at step 757 (FIG. 7D), the system delivers the selected bonus award to the player. At step 760, the player is notified of the award. As shown by arrow 763, step 760 can be omitted. At step 766, the player's receipt of the bonus award is recorded in the player tracking database. As shown by arrow 769, this step can be omitted.

At step 772, the system checks whether the selected bonus award should be returned to the system as if it had not been given to the player. Aside from the situation where the player is no longer eligible for the bonus award (as checked at step 754), the award can be expired for other reasons. For example, if the player does not accept the bonus award within a certain amount of time, the award can be withdrawn from the player and returned to the available awards. If the award is to be expired, then at step 775 the award is withdrawn from the player (if the player received the award), and at step 778 the selected bonus award is returned to the set of available bonus awards. As shown by arrow 781, step 778 can be omitted, in which case the selected award is not given to anyone (it is withdrawn from the player to which is was initially delivered, but not available for anyone else to win).

Figure 8A:
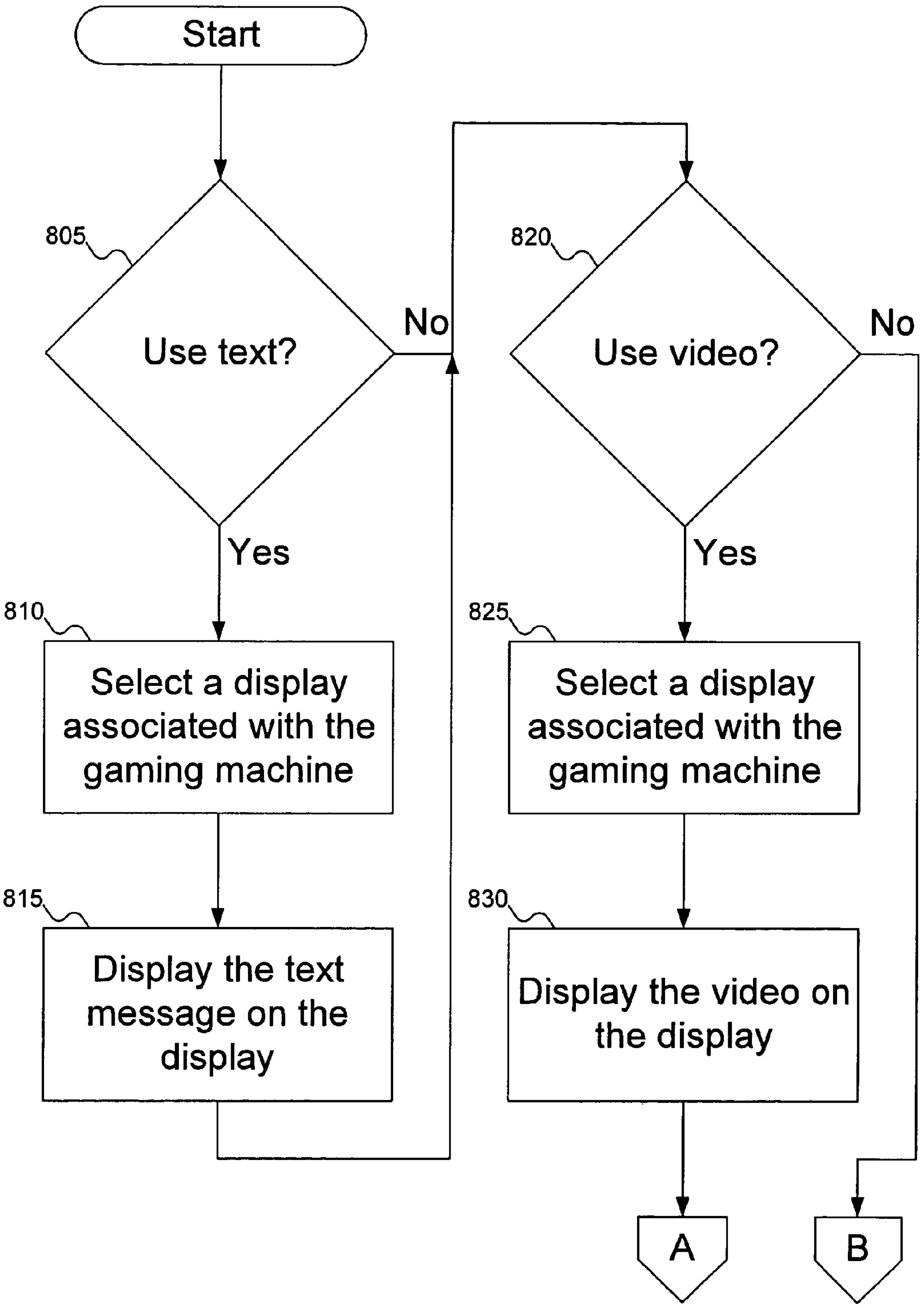
FIGS. 8A-8B show a flowchart of the procedure for notifying a player of the random bonus award in the system of FIG. 1, according to an embodiment of the invention.
Figure 8B:
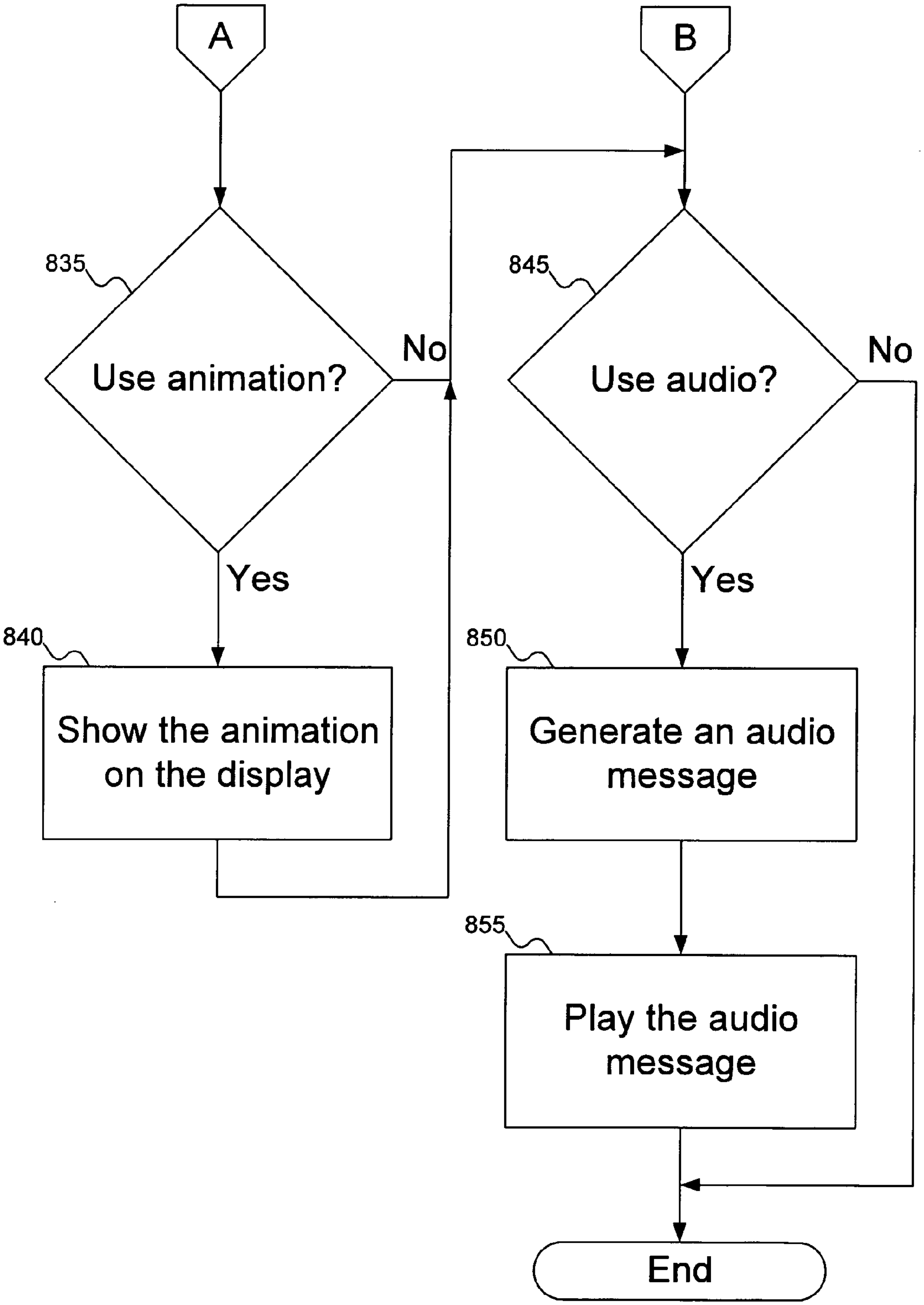

FIGS. 8A-8B show a flowchart of the procedure for notifying a player of the random bonus award in the system of FIG. 1, according to an embodiment of the invention. In FIG. 8A, at step 805, the system determines whether it is using text to notify the player. If so, then at step 810, a display associated with the gaming machine is selected. As discussed above with reference to FIG. 6, the display can be the native display (if the gaming machine has one), or a secondary display associated with the gaming machine. At step 815, the text message is displayed on the display.

At step 820, the system determines whether it is using video to notify the player. If so, then at step 825, a display associated with the gaming machine is selected, and at step 830 the video is displayed on the selected display. At step 835 (FIG. 8B), the system determines whether animation is being used to notify the player (e.g., to simulate the random selection of the bonus award for the player). If so, then at step 840, the system shows the animation on the selected display.

At step 845, the system determines whether it is using audio to notify the player. If so, then at step 850, the system generates an audio message, and at step 855 the audio message is played.

A person skilled in the art will recognize that an embodiment of the invention described above can be implemented using a computer. In that case, the method is embodied as instructions that make up a program. The program may be stored on computer-readable media, such as floppy disks, optical discs (such as compact discs), or fixed disks (such as hard drives), and can be resident in memory, such as random access memory (RAM), read-only memory (ROM), firmware, or flash RAM memory. The program as software can then be executed on a computer to implement the method. The program, or portions of its execution, can be distributed over multiple computers in a network.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. A system for awarding a random bonus award, comprising:
- a gaming machine;
- a set of bonus awards including at least two bonus awards, including at least a default award and a plurality of non-default awards wherein the default award is reused after being awarded during an active bonus session and wherein each of the non-default awards is used a single time during the active bonus session;
- a criterion dependent on at least one of a status of a player and an action of the player;
- a player tracking database communicatively coupled to the gaming machine using a network, the database comprising a session identifier configured to indicate that a bonus session is active if the player has not received a bonus award from the set of bonus awards during a session;
- a selector configured to select a bonus award at random from the set of bonus awards if the session identifier indicates that the bonus session is active; and
- an awarder configured to deliver the selected bonus award to the player after the player meets the criterion.

2. A system according to claim 1, further comprising a player identifier connected to the gaming machine.

3. A system according to claim 1, wherein the selector is configured to select the bonus award before the player begins play on the gaming machine.

4. A system according to claim 1, wherein the gaming machine includes the awarder.

5. A system according to claim 1, further comprising:
- a bonus server, the bonus server including the criterion and the selector; and
- a network connecting the bonus server and the gaming machine.

6. A system according to claim 1, further comprising:
- a server, the server including a player tracking database; and
- a network connecting the server, the gaming machine, and the selector.

7. A system according to claim 1, wherein the set of bonus awards includes at least a first non-default award.

8. A system according to claim 1, wherein the bonus awards in the set of bonus awards are drawn from: cash, credits, and non-monetary awards.

9. A system according to claim 2, wherein the player identifier includes a card reader.

10. A system according to claim 2, wherein the selector is configured to select the bonus award after the player is identified by the player identifier.

11. A system according to claim 2, wherein the selector is configured to select the bonus award after the player is identified by the player identifier and before the player begins play on the gaming machine.

12. A system according to claim 4, wherein the awarder includes a graphical display.

13. A system according to claim 4, wherein the awarder includes a textual display.

14. A system according to claim 4, wherein the awarder includes:
- an audio message generator configured to generate an audio message regarding the bonus award; and
- a speaker configured to output the audio message to the player.

15. A system according to claim 12, wherein the gaming machine includes a primary display used to play the game, the primary display distinct from the graphical display.

16. A system according to claim 5, wherein:
- the bonus server further comprises the session identifier; and
- the selector is configured to select the bonus award only if the session identifier indicates that the bonus session is active.

17. A system according to claim 5, further comprising a server, the server including a player tracking database and connected to the network.

18. A system according to claim 6, further comprising means for accessing the player tracking database to determine if the player meets the criterion.

19. A system according to claim 7, wherein the set of bonus awards further includes a second non-default award.

20. A system according to claim 7, wherein the set of bonus awards further includes a default award.

21. A method for awarding a random bonus award on a gaming machine, said method comprising:
- identifying a criterion for the selection of a bonus award, the criterion dependent on at least one of a status of a player playing the gaming machine and an action of the player;
- determining that the player meets the criterion;
- determining that a bonus session is active on the gaming machine if the player has not received a bonus award from the set of bonus awards during a session;
- selecting a bonus award at random from a set of bonus awards including at least two bonus awards if the bonus session is determined to be active, the set of bonus awards including at least a default award and a plurality of non-default awards wherein the default award is reused after being awarded during an active bonus session and wherein each of the non-default awards is used a single time during the active bonus session; and
- awarding the selected bonus award to the player playing the gaming machine.

22. A method according to claim 21, wherein identifying a criterion includes identifying the criterion drawn from a set including: an account of the player in a player tracking database is flagged; the player has played for a minimum amount of time; the player has played a minimum amount of coin-in; the player last played within a minimum amount of time; the player has achieved a combination of positive gaming machine outcomes; the player has a minimum number of handles per trip; the player has a minimum number of handles per unit time; and the player has a minimum amount of continuous play.

23. A method according to claim 21, further comprising identifying the player of the gaming machine.

24. A method according to claim 21, wherein selecting a bonus award includes selecting a first non-default award from the set of bonus awards.

25. A method according to claim 21, wherein selecting a bonus award includes selecting a default award from the set of bonus awards.

26. A method according to claim 21, further comprising defining the set of bonus awards to include at least two bonus awards.

27. A method according to claim 21, further comprising awarding a consolation award to the player.

28. A method according to claim 21, wherein determining that a bonus session is active includes:
- determining a type of a gaming machine being used by the player; and
- determining that a bonus session is active for the type of gaming machine.

29. A method according to claim 21, wherein awarding the selected bonus award to the player includes awarding the selected bonus award to the player if the bonus session is active.

30. A method according to claim 21, wherein awarding the selected bonus award to the player includes:

receiving a message about the selected bonus award at a gaming machine in use by the player;

verifying at the gaming machine that the player still satisfies the criterion; and awarding the selected bonus award to the player by the gaming machine if the gaming machine verifies that the player still meets the criterion for the bonus award.

31. A method according to claim 21, wherein awarding the selected bonus award to the player includes notifying the player of the selected bonus award.

32. A method according to claim 21, further comprising identifying the player as having received the bonus award.

33. A method according to claim 21, further comprising expiring the selected bonus award for the player if a condition is met, the condition drawn from a set including: a time limit; an arrival of an end of the bonus session; and the player ending play.

34. A method according to claim 23, wherein:

selecting a bonus award includes selecting the bonus award after the player is identified; and awarding the selected bonus award includes awarding the selected bonus award to the player before the player has begun to play the gaming machine.

35. A method according to claim 24, wherein selecting a bonus award further includes removing the first non-default award from the set of bonus awards.

36. A method according to claim 24, wherein selecting a bonus award further includes leaving the first non-default award in the set of bonus rewards.

37. A method according to claim 25, wherein selecting a bonus award further includes leaving the default award in the set of bonus awards.

38. A method according to claim 26, wherein defining the set of bonus awards includes defining the set of bonus awards to include at least a first non-default award.

39. A method according to claim 38, wherein defining the set of bonus awards further includes defining a set of bonus awards to include at least a second non-default award.

40. A method according to claim 38, wherein defining the set of bonus awards further includes defining the set of bonus awards to include at least a default award.

41. A method according to claim 40, wherein defining the set of bonus awards further includes defining the set of bonus awards to include at least the first award and a plurality of default awards in a desired initial ratio.

42. A method according to claim 28, wherein identifying a bonus award includes selecting the bonus award at random from a set of bonus awards associated with the bonus session for the type of gaming machine.

43. A method according to claim 30, further comprising returning the selected bonus award to the set of bonus awards if the gaming machine fails to verify that the player still meets the criterion for the bonus award.

44. A method according to claim 31, wherein notifying the player of the selected bonus award includes displaying a text message to the user.

45. A method according to claim 31, wherein notifying the player of the selected bonus award includes presenting an audio announcement.

46. A method according to claim 31, wherein notifying the player of the selected bonus award includes presenting a video announcement.

47. A method according to claim 44, wherein displaying a text message includes displaying the selected bonus award in the text message.

48. A method according to claim 46, wherein presenting a video announcement includes simulating the random selection of the selected bonus award.

49. A method according to claim 46, wherein presenting a video announcement includes presenting an audio announcement.

50. A method according to claim 46, wherein presenting a video announcement includes presenting the video announcement on a primary display of the gaming machine.

51. A method according to claim 46, wherein presenting a video announcement includes presenting the video announcement on a secondary display of the gaming machine.

52. A method according to claim 32, wherein identifying the player as having received the selected bonus award includes identifying the player in a player tracking database as having received the selected bonus award.

53. A non-transitory computer-readable medium containing a program to award a random bonus award, comprising:

software to identify a criterion for the selection of a bonus award, the criterion dependent on at least one of a status of a player and an action of the player;

software to determine that the player meets the criterion;

software to determine that a bonus session is active if the player has not received a bonus award from the set of bonus awards during a session, the set of bonus awards including at least a default award and a plurality of non-default awards wherein the default award is reused after being awarded during an active bonus session and wherein each of the non-default awards is used a single time during the active bonus session;

software to select a bonus award at random from a set of bonus awards if the bonus session is active, wherein the set of bonus awards includes at least two bonus awards; and software to award the selected bonus award to the player.

54. A non-transitory computer-readable medium containing a program according to claim 53, wherein the software to identify a criterion includes software to identify the criterion drawn from a set including: an account of the player in a player tracking database is flagged; the player has played for a minimum amount of time; the player has played a minimum amount of coin-in; an account of the player in a player tracking database is flagged; the player last played within a minimum amount of time; the player has achieved a combination of positive gaming machine outcomes; the player has a minimum number of handles per trip; the player has a minimum number of handles per unit time; and the player has a minimum amount of continuous play.

55. A non-transitory computer-readable medium containing a program according to claim 53, the program further comprising software to identify the player of a gaming machine.

56. A non-transitory computer-readable medium containing a program according to claim 53, wherein:

the software to select a bonus award includes software to select the bonus award after the player is identified; and the software to award the selected bonus award includes software to award the selected bonus award to the player before the player has begun to play the gaming machine.

57. A non-transitory computer-readable medium containing a program according to claim 53, wherein the software to select a bonus award includes software to select a first non-default award from the set of bonus awards.

58. A non-transitory computer-readable medium containing a program according to claim 53, wherein the software to select a bonus award includes software to select a default award from the set of bonus awards.

59. A non-transitory computer-readable medium containing a program according to claim 53, the program further comprising software to define the set of bonus awards to include at least the two bonus awards.

60. A non-transitory computer-readable medium containing a program according to claim 53, wherein the software to determine that a bonus session is active includes:

software to determine a type of a gaming machine being used by the player; and software to determine that a bonus session is active for the type of the gaming machine.

61. A non-transitory computer-readable medium containing a program according to claim 53, wherein the software to award the selected bonus award to the player includes:

software to receive a message about the selected bonus award at a gaming machine in use by the player;

software to verify at the gaming machine that the player still satisfies the criterion; and software to award the selected bonus award to the player by the gaming machine if the gaming machine verifies that the player still meets the criterion for the bonus award.

62. A non-transitory computer-readable medium containing a program according to claim 53, wherein the software to award the selected bonus award to the player includes software to notify the player of the selected bonus award.

63. A non-transitory computer-readable medium containing a program according to claim 53, the program further comprising software to identify the player as having received the selected bonus award.

64. A non-transitory computer-readable medium containing a program according to claim 63, wherein the software to identify the player as having received the selected bonus award includes software to identify the player in a player tracking database as having received the selected bonus award.

65. A non-transitory computer-readable medium containing a program according to claim 53, the program further comprising software to expire the selected bonus award for the player if a condition is met, the condition drawn from a set including: a time limit; an arrival of an end of the bonus session; and the player ending play.

66. A non-transitory computer-readable medium containing a program according to claim 57, wherein the software to select a bonus award further includes software to remove the first non-default award from the set of bonus awards.

67. A non-transitory computer-readable medium containing a program according to claim 57, wherein the software to select a bonus award further includes software to leave the first non-default award in the set of bonus awards.

68. A non-transitory computer-readable medium containing a program according to claim 58, wherein the software to select a bonus award further includes software to leave the default award in the set of bonus awards.

69. A non-transitory computer-readable medium containing a program according to claim 59, wherein the software to define the set of bonus awards includes software to define the set of bonus awards to include at least a first non-default award.

70. A non-transitory computer-readable medium containing a program according to claim 69, wherein the software to define the set of bonus awards further includes software to define the set of bonus awards to include at least a second non-default award.

71. A non-transitory computer-readable medium containing a program according to claim 69, wherein the software to define the set of bonus awards further includes software to define the set of bonus awards to include at least a default award.

72. A non-transitory computer-readable medium containing a program according to claim 71, wherein the software to define the set of bonus awards further includes software to define the set of bonus awards to include at least the first award and a plurality of default awards in a desired initial ratio.

73. A non-transitory computer-readable medium containing a program according to claim 60, wherein the software to identify a bonus award includes software to select the bonus award at random from a set of bonus awards associated with the bonus session for the type of gaming machine.

74. A non-transitory computer-readable medium containing a program according to claim 61, the program further comprising software to return the selected bonus award to the set of bonus awards if the gaming machine fails to verify that the player still meets the criterion for the bonus award.

75. A non-transitory computer-readable medium containing a program according to claim 62, wherein the software to notify the player of the selected bonus award includes software to display a text message to the user.

76. A non-transitory computer-readable medium containing a program according to claim 62, wherein the software to notify the player of the selected bonus award includes software to present an audio announcement.

77. A non-transitory computer-readable medium containing a program according to claim 62, wherein the software to notify the player of the selected bonus award includes software to present an video announcement.

78. A non-transitory computer-readable medium containing a program according to claim 75, wherein the software to display a text message includes software to display the selected bonus award in the text message.

79. A non-transitory computer-readable medium containing a program according to claim 77, wherein the software to present a video announcement includes software to simulate the random selection of the selected bonus award.

80. A non-transitory computer-readable medium containing a program according to claim 77, wherein the software to present a video announcement includes software to present an audio announcement.

81. A non-transitory computer-readable medium containing a program according to claim 77, wherein the software to present a video announcement includes software to present the video announcement on a primary display of the gaming machine.

82. A non-transitory computer-readable medium containing a program according to claim 77, wherein the software to present a video announcement includes software to present the video announcement on a secondary display of the gaming machine.

* * * * *